(12) United States Patent
Vondell et al.

(10) Patent No.: US 10,961,736 B1
(45) Date of Patent: Mar. 30, 2021

(54) SKIMMER SYSTEM FOR A FIBERGLASS SWIMMING POOL BODY

(71) Applicant: Thursday Pools, Fortville, IN (US)

(72) Inventors: Edward Vondell, Fishers, IN (US); William Khamis, Fortville, IN (US)

(*) Notice: Subject to any disclaimer, the term of this patent is extended or adjusted under 35 U.S.C. 154(b) by 0 days.

(21) Appl. No.: 16/773,326

(22) Filed: Jan. 27, 2020

(51) Int. Cl.
*E04H 4/12* (2006.01)
*C02F 1/40* (2006.01)
*C02F 103/42* (2006.01)

(52) U.S. Cl.
CPC ............. *E04H 4/1272* (2013.01); *C02F 1/40* (2013.01); *C02F 2103/42* (2013.01)

(58) Field of Classification Search
CPC ....... E04H 4/1272; C02F 1/40; C02F 2103/42
USPC ....................................................... 210/167.1
See application file for complete search history.

(56) References Cited

U.S. PATENT DOCUMENTS

| | | | | |
|---|---|---|---|---|
| 4,244,716 A | * | 1/1981 | Duske | B04C 3/00 210/512.1 |
| 6,393,628 B1 | * | 5/2002 | Kellogg | E04H 4/1272 4/490 |
| 2009/0159516 A1 | * | 6/2009 | Andrei | E04H 4/1272 210/167.12 |
| 2017/0030099 A1 | * | 2/2017 | Vogtner | E04H 4/1272 |
| 2017/0101796 A1 | * | 4/2017 | Goettl | E04H 4/169 |

* cited by examiner

*Primary Examiner* — Fred Prince
(74) *Attorney, Agent, or Firm* — C. John Brannon; Brannon Sowers & Cracraft PC

(57) ABSTRACT

A skimmer assembly for connection to a fiberglass swimming pool via a circular fluidic access port formed therethrough, and having a conduit for fluidic connection to the fluidic access port, wherein the conduit defines a circular end for connection to the fluid access port and an oppositely disposed rectangular end with a contoured body portion extending therebetween defining a flow path. The assembly further includes a skimmer defining a rectangular fluid inlet, a cylindrical skimmer body portion, a generally rectangular channel connecting the rectangular inlet and the cylindrical body portion in fluidic communication, and a fluid outlet connected in fluidic communication with the cylindrical body portion.

15 Claims, 7 Drawing Sheets

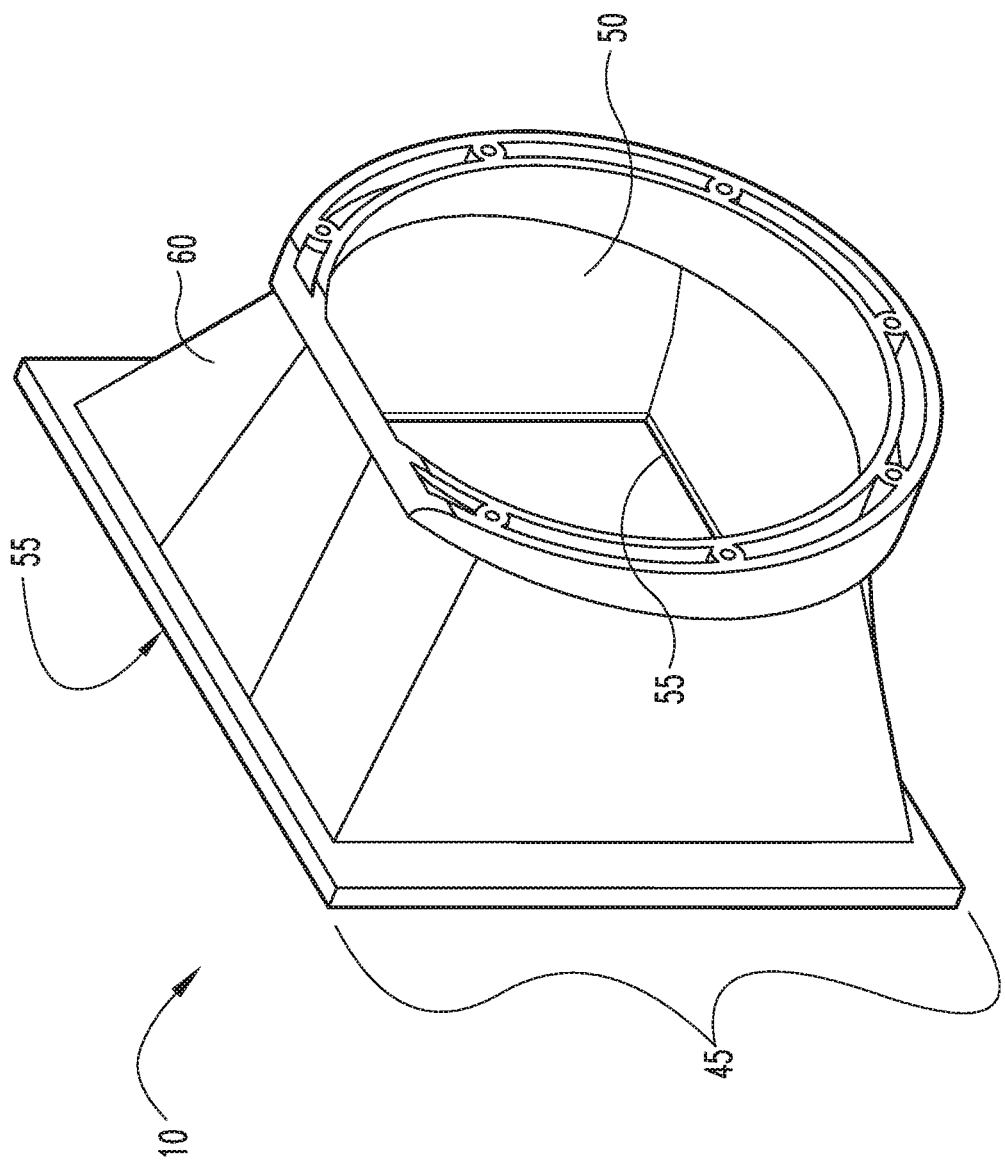

US 10,961,736 B1

SKIMMER SYSTEM FOR A FIBERGLASS SWIMMING POOL BODY

TECHNICAL FIELD

The present novel technology relates generally to the field of swimming pools, and, more particularly, to an skimmer assembly connected to a fiberglass swimming pool body through a circular port.

BACKGROUND

Preformed fiberglass swimming pools offer many advantages over in-situ formed shotcrete or concrete walled swimming pools. Fiberglass pool bodies may be quickly and inexpensively formed and require considerably less effort to put into the ground. Fiberglass pool bodies are typically connected to a skimmer assembly to filter, sanitize, strain and return water into the pool body (recirculation), typically via return wall fittings positioned opposite the skimmer or strategically throughout the pool. Typical skimmer assemblies have a rectangular pool interface port, necessitating the cutting of a rectangular aperture through the fiberglass swimming pool wall. Such apertures are typically saw-cut, and include four right angle corners, which can act as stress concentrators and crack propagation sites.

Thus, there remains a need for a method and apparatus that would allow the skimming of water from a fiberglass swimming pool that would likewise allow connection to standard skimmer assemblies, simplify the 'cut out' process, reduce time and labor, and avoid having to introduce stress concentrating rectangular cut apertures. The present novel technology addresses this need.

BRIEF DESCRIPTION OF THE DRAWINGS

FIG. 1 is a first perspective view of a first embodiment skimmer adapter assembly of the present novel technology.

DETAILED DESCRIPTION OF THE PREFERRED EMBODIMENT

Figure 2A:
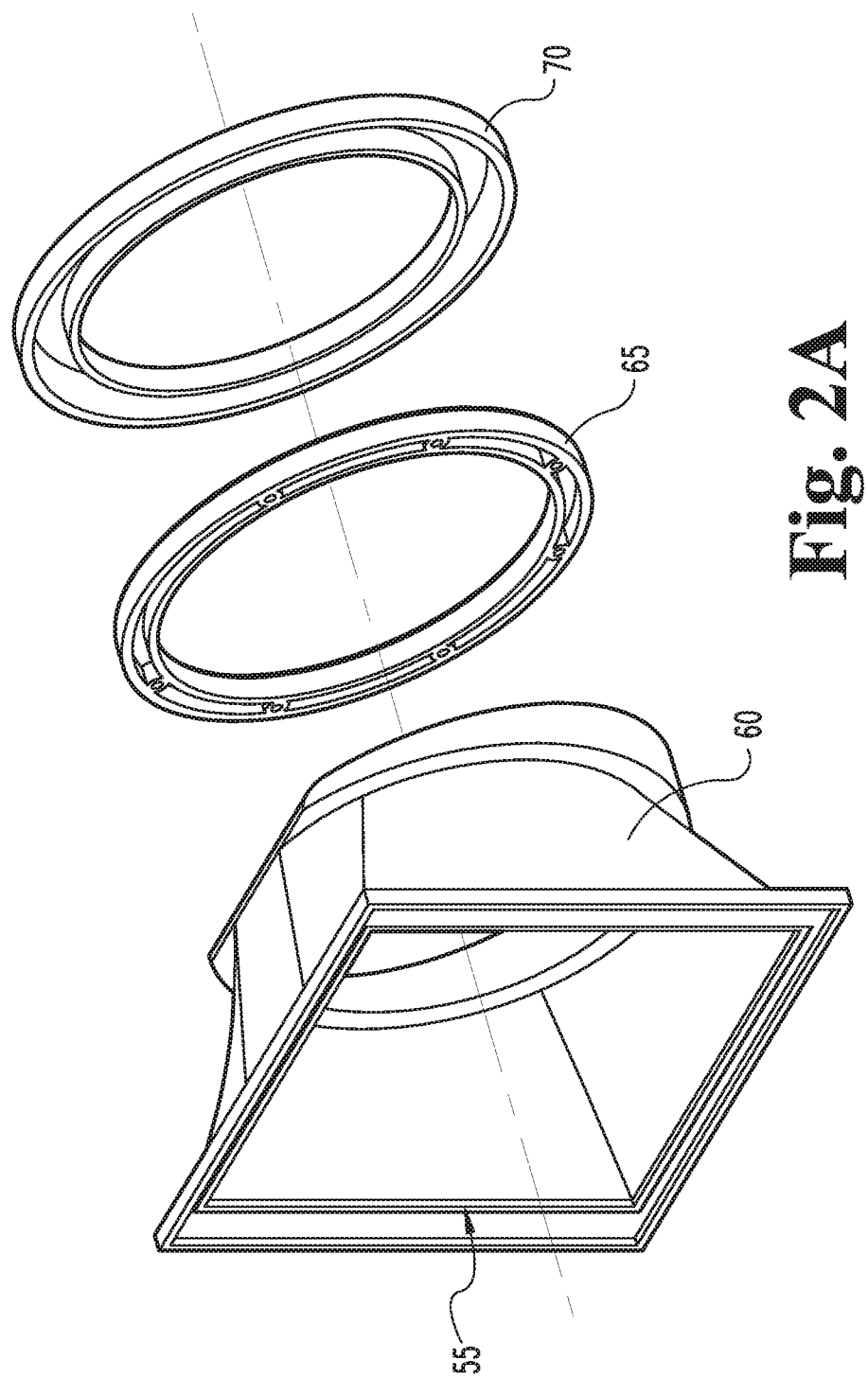
FIG. 2 is an exploded perspective view and side cutaway view of the assembly of FIG. 1
Figure 2B:
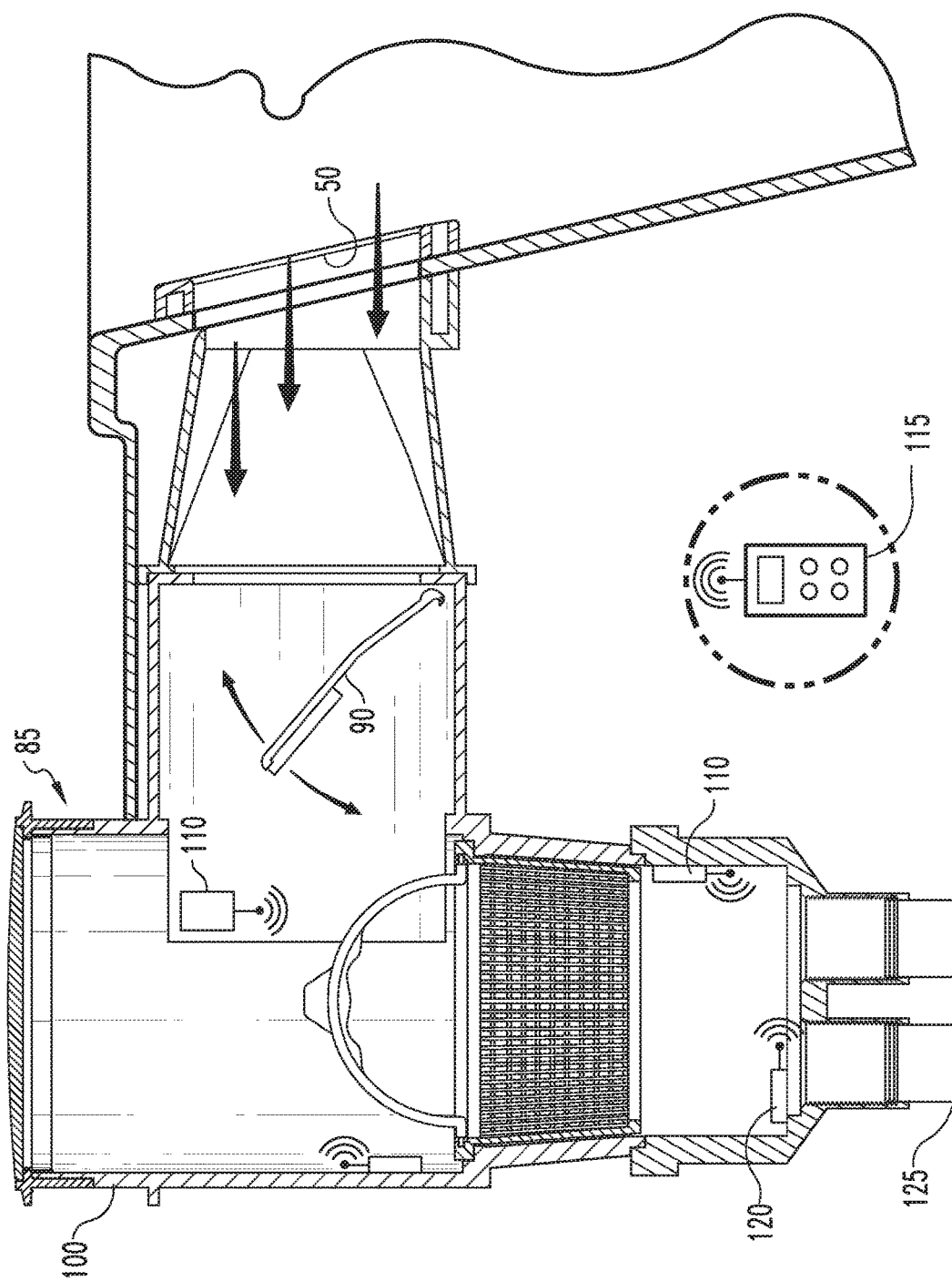
Figure 3:
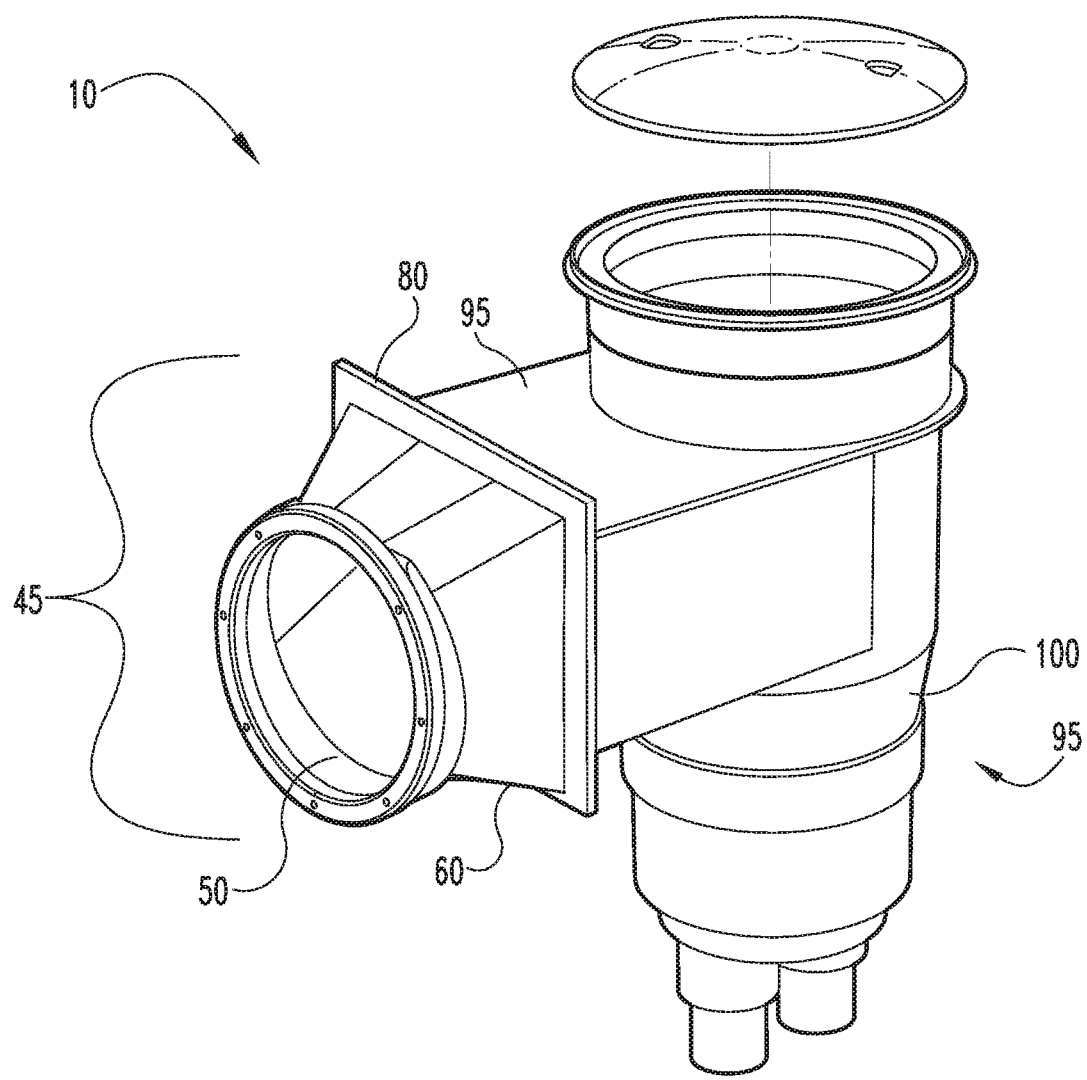
FIG. 3 is a perspective view of the assembly of FIG. 1 engaged with a standard skimmer.
Figure 4:
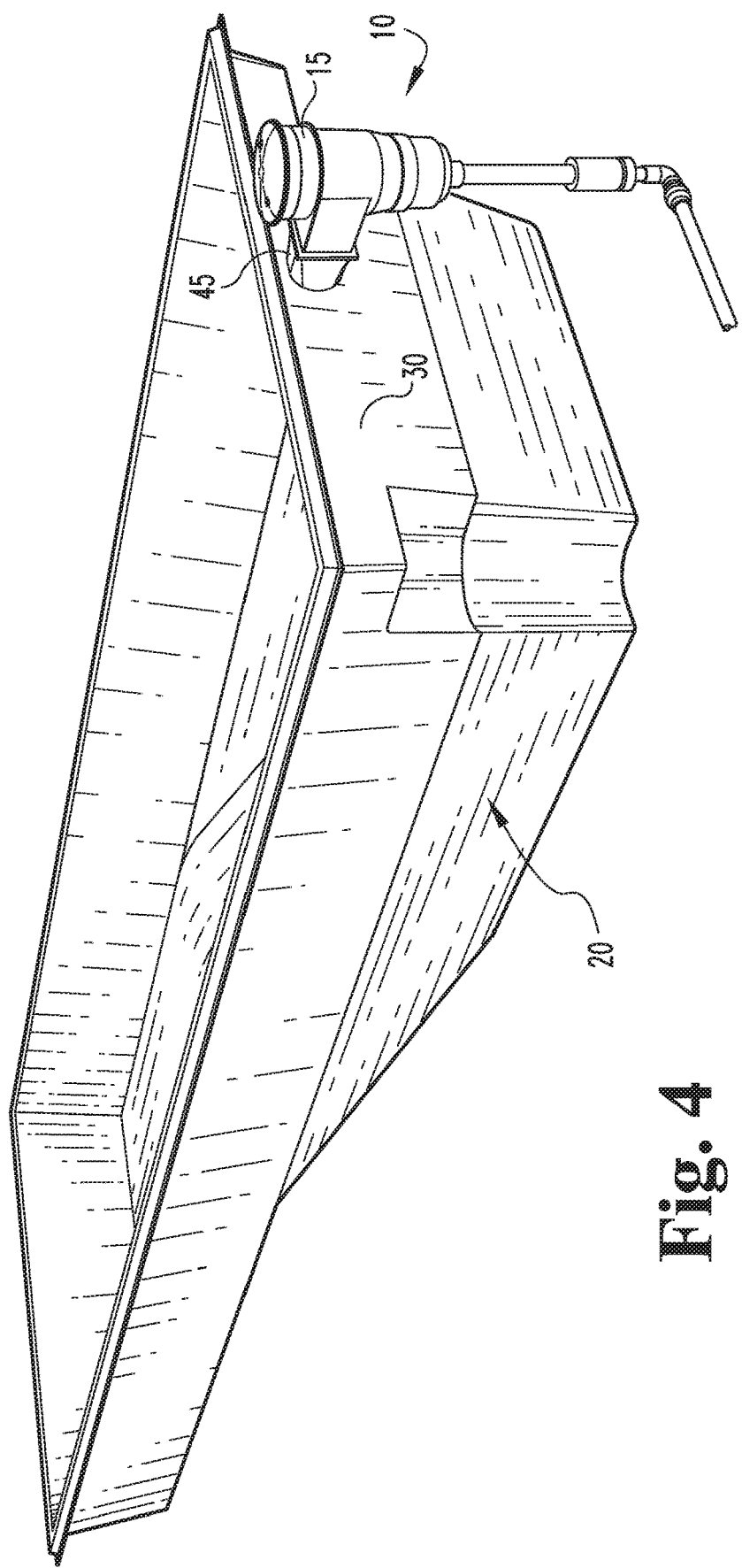
FIG. 4 is a perspective view of the assembly of FIG. 1 engaged with a pool body.
Figure 5:
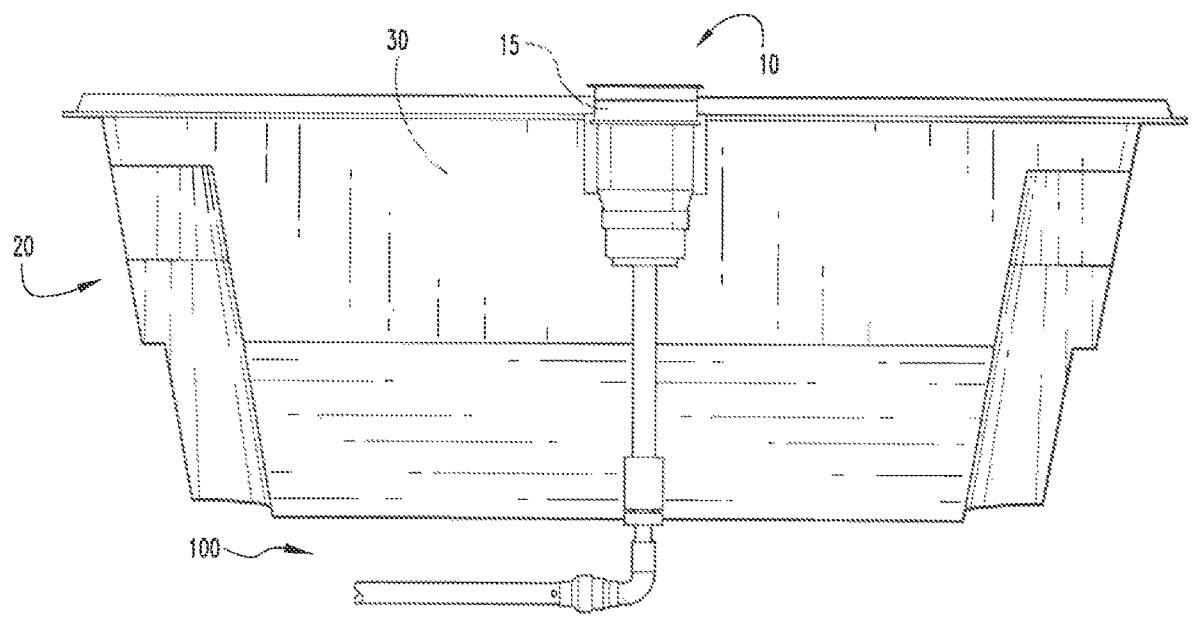
FIG. 5 is an end view of the embodiment of FIG. 4.
Figure 6:
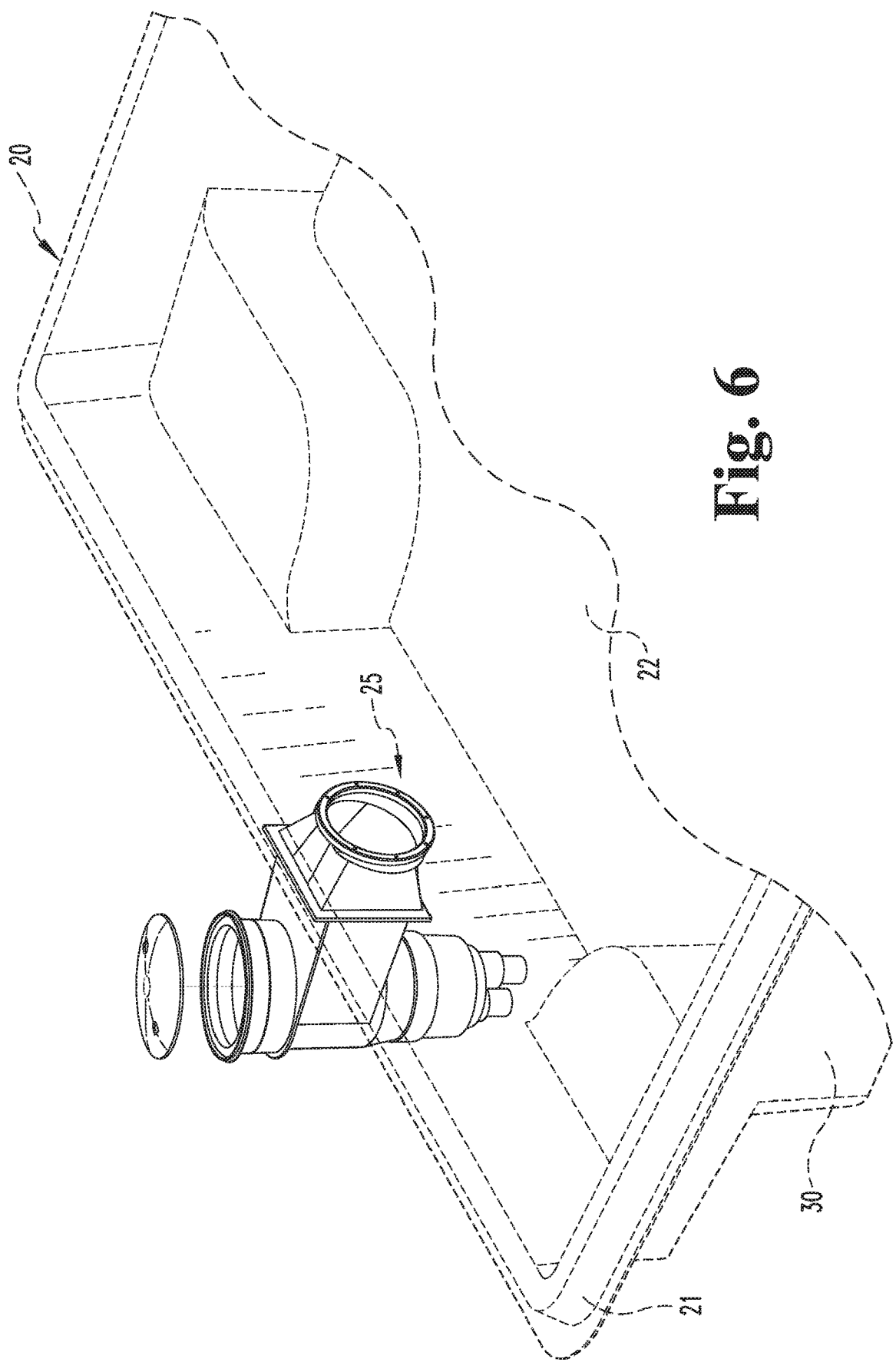
FIG. 6 is a perspective view of the system of FIG. 4.

For the purposes of promoting an understanding of the principles of the novel technology and presenting its currently understood best mode of operation, reference will now be made to the embodiments illustrated in the drawings and specific language will be used to describe the same. It will nevertheless be understood that no limitation of the scope of the novel technology is thereby intended, with such alterations and further modifications in the illustrated device and such further applications of the principles of the novel technology as illustrated therein being contemplated as would normally occur to one skilled in the art to which the novel technology relates.

The present novel technology relates to an adapter system 10 for mounting or connecting a skimmer assembly 15 in cooperation with a fiberglass or like preformed swimming pool body 20 (top edge 21 and bottom portion 22 connected by at least one sidewall 30) having a circular aperture 25 cut or otherwise positioned therethrough. The circular aperture 25 is made through a sidewall 30, such as cut with a hole saw, and as such is cornerless.

The system 10 includes an adapter or conduit assembly 10 including an adapter body 45 for the transmission of water therethrough and having a circular opening 50, an oppositely disposed rectangular opening 55, and a contoured body portion 60 extending therebetween to define a water channel. The assembly 10 further includes a circular mounting plate 65 for securing the adapter body 45 to the swimming pool body 20 and typically further includes a circular trim cover 70 for connection over the mounting plate 65. The circular and rectangular openings 50, 55 are typically tilted at an angle of seven degrees relative each other to accommodate the slope of the wall 30 of the swimming pool body 20.

The rectangular opening 55 typically operationally connects to the rectangular opening 80 of a standard skimmer assembly 85. Water may then flow from the swimming pool body, through the aperture 25 and adapter body 45 and water channel so defined therethrough 60, through the skimmer assembly 85 and from there back to a pump.

Most embodiment skimmer assemblies 85 include a rectangular weir or 'flapper' 90 positioned in the channel 95 extending between the rectangular opening 80 and a vertically oriented generally cylindrical main body portion 100. The weir 90 is pivotably connected to the channel 95 and acts to block debris from returning to the pool. The weir 90 tends to function most efficiently when it has a rectangular shape and is operationally connected within a channel 95 of slightly larger rectangular cross-section. The weir 90 functions to allow for floating debris to be captured and more easily removed from the pool surface, localizes debris in the skimmer body 100 if the pump were to be shut off, and serves to standardize the flow of water through the skimmer body 100 so as to minimize the incidence of 'gulps' of air entering the pump and filter systems when the pool is in use.

In some embodiments, one or more water level sensors 110 are positioned in the skimmer body 100. Typically, sensors are positioned at predetermined low and high water levels, typically with a third sensor 110 positioned at an even higher level to detect water overflow. An electronic controller 115 is operationally connected to the sensors 110, and signals from the sensors 110 are monitored and processed to determine pool water level conditions. The electronic controller 115 is typically also connected in electric communication with a solenoid valve assembly 120 disposed in the skimmer assembly 85 and operationally connected to a water inlet line 125, such that the electronic controller 115 may energize the solenoid valve assembly 120 to enable water flow into the pool 20, either directly or through the skimmer assembly 85, when the water level is low, such as via evaporation and as determined by sensor 110 signals, and to close the valve 120 when the water level is high as determined by sensor 110 signals. The electronic controller 115 may also send a message to the pool owner, such as via email or an associated app, to alert the owner when the water level is low, high, at overflow, and when the pool is being filled, and may also receive instructions from the owner to open or close the valve 120.

In operation, a circular hole 25 is first cut through the sidewall 30 and the circular opening 50 of the adapter body 45 is engaged therethrough. The circular aperture 25 functions as a fluid access port. The adapter body 45 is secured in place via connection to the mounting plate 65, which is likewise connected to the sidewall 30. The rectangular opening 55 of the adapter body 45 is connected to the rectangular opening 80 of the skimmer assembly 85 which is positioned in ground adjacent the swimming pool 20. The main body 100 is typically connected to a drain pipe leading back to a water pump and/or a sewer drain pipe. Sensors 110, if present, are operationally connected, typically in wireless communication, with microprocessor 115, and the microprocessor 115 is likewise connected in electric communication with the solenoid 120 (if present), which in turn is operationally connected to a water source. Water may then be circulated through circular opening 25, through adapter assembly 40, through skimmer assembly 15, to pump and back into pool body 20. Water may also be introduced into the pool 20 via energization of the solenoid 120 in response to a signal from the electronic controller 115.

The pool body 20 may be of any convenient shape, including rectangular, generally rectangular, kidney shaped, round, oval, or the like. The aperture 25 may be formed through any convenient sidewall 30.

While the novel technology has been illustrated and described in detail in the drawings and foregoing description, the same is to be considered as illustrative and not restrictive in character. It is understood that the embodiments have been shown and described in the foregoing specification in satisfaction of the best mode and enablement requirements. It is understood that one of ordinary skill in the art could readily make a nigh-infinite number of insubstantial changes and modifications to the above-described embodiments and that it would be impractical to attempt to describe all such embodiment variations in the present specification. Accordingly, it is understood that all changes and modifications that come within the spirit of the novel technology are desired to be protected.

We claim:

1. A fiberglass swimming pool skimmer system, comprising:
   a swimming pool body defining a top edge and an oppositely disposed bottom portion connected by at least one sidewall;
   a circular fluid access port positioned through the at least one sidewall;
   a conduit fluidically connected to the fluidic access port and extending away from the swimming pool body; wherein the conduit defines a circular end connected to a fluid access port and an oppositely disposed rectangular end with a contoured body portion extending therebetween;
   a skimmer assembly defining a rectangular fluid inlet, a cylindrical skimmer body portion, a generally rectangular channel connecting the rectangular inlet and the cylindrical body portion in fluidic communication, and a fluid outlet connected in fluidic communication with the cylindrical body portion.

2. The fiberglass swimming pool skimmer system of claim 1 and further comprising a generally rectangular weir operationally connected in the generally rectangular channel.

3. The fiberglass swimming pool skimmer system of claim 1 and further comprising a mounting plate connecting the conduit to the fluid access port.

4. The fiberglass swimming pool skimmer system of claim 1 and further comprising at least one water level sensor operationally connected to the skimmer assembly; and an electronic controller connected in electric communication to the at least one water level sensor.

5. The fiberglass swimming pool skimmer system of claim 4 and further comprising a solenoid valve disposed in the skimmer assembly; wherein the solenoid valve is connected in electric communication with the electronic controller.

6. The fiberglass swimming pool skimmer system of claim 5 and further comprising a water source operationally connected in fluidic communication with the solenoid valve.

7. An adapter connecting a skimmer assembly to a preformed swimming pool, comprising:
   a conduit defining a circular end and an oppositely disposed rectangular end with a contoured body portion extending therebetween; and
   a hole saw;
   wherein the adapter and the hole saw define a kit.

8. The kit of claim 7 and further comprising:
   a skimmer assembly defining a rectangular fluid inlet, a cylindrical skimmer body portion, a generally rectangular channel connecting the rectangular inlet and the cylindrical body portion in fluidic communication, and a fluid outlet connected in fluidic communication with the cylindrical body portion.

9. The kit of claim 7 and further comprising:
   at least one water level sensor operationally connected to the skimmer assembly; and an electronic controller connectable in electric communication to the at least one water level sensor.

10. The kit of claim 9 and further comprising:
    a solenoid valve disposed in the skimmer assembly; wherein the solenoid valve is connectable in electric communication with the electronic controller.

11. A skimmer assembly for connection to a fiberglass swimming pool via a circular fluidic access port formed therethrough, comprising:
    a conduit for fluidic connection to the fluidic access port, wherein the conduit defines a circular end for connection to the fluid access port and an oppositely disposed rectangular end with a contoured body portion extending therebetween defining a flow path;
    a skimmer defining a rectangular fluid inlet, a cylindrical skimmer body portion, a generally rectangular channel connecting the rectangular inlet and the cylindrical body portion in fluidic communication, and a fluid outlet connected in fluidic communication with the cylindrical body portion.

12. The assembly of claim 11 and further comprising a generally rectangular weir operationally connected in the generally rectangular channel.

13. The assembly of claim 11 and further comprising at least one water level sensor operationally connected to the skimmer assembly; and an electronic controller connected in electric communication to the at least one water level sensor.

14. The assembly of claim 13 and further comprising a solenoid valve disposed in the skimmer cylindrical body portion; wherein the solenoid valve is connected in electric communication with the electronic controller.

15. The assembly of claim 14 and further comprising a water source operationally connected in fluidic communication with the solenoid valve.

* * * * *